United States Patent [19]

Maier

[11] 4,449,869
[45] May 22, 1984

[54] DEVICE FOR THE MANUFACTURE OF GEAR WHEELS FOR LOW NOISE GEARINGS

[75] Inventor: Kurt Maier, Karlsruhe, Fed. Rep. of Germany

[73] Assignee: BHS-Dr. Ing. Hofler Maschinenbau GmbH, Ettlingen-Oberweier, Fed. Rep. of Germany

[21] Appl. No.: 204,542

[22] Filed: Nov. 6, 1980

[30] Foreign Application Priority Data

Dec. 21, 1979 [DE] Fed. Rep. of Germany ....... 2951876

[51] Int. Cl.$^3$ .............................................. B23F 5/22
[52] U.S. Cl. ...................................................... 409/11
[58] Field of Search ..................... 409/11, 12, 15, 2, 3, 409/14, 16, 19, 21, 26

[56] References Cited

U.S. PATENT DOCUMENTS

| | | | |
|---|---|---|---|
| 915,923 | 3/1909 | Zimmermann | 409/12 |
| 2,996,958 | 8/1961 | Mente | 409/21 |
| 3,653,290 | 4/1972 | Hunkeler | 409/26 |

Primary Examiner—Z. R. Bilinsky
Attorney, Agent, or Firm—Silverman, Cass & Singer, Ltd.

[57] ABSTRACT

A gear cutting machine is provided with gearing providing additional inaccuracies to superimpose the additional inaccuracies over the normal or residual gear cutting inaccuracies of the machine. The resultant errors cut into the gears provide gears having desired noise characteristics. The additional inaccuracies are of a higher frequency than the residual errors so that noise above the audible frequency range is provided by the gears so cut. The gear cutting machine has gearing for driving the hobbing spindle and for indexing a rotary table through worm gearing. The spindle drive gear and the worm drive gear are provided with eccentric sockets for introducing the additional inaccuracies. The drive gears also are provided with deformable portions providing the drive gear teeth so that the drive gears may be deformed into polygons. The eccentric sockets and polygonal drive gears are retained in position on the shafts that they drive by a nut and intermediary element.

15 Claims, 15 Drawing Figures

DEVICE FOR THE MANUFACTURE OF GEAR WHEELS FOR LOW NOISE GEARINGS

The invention relates to a method and a device for the manufacture of gear wheels to be used in noise-dampened gearings.

It is known from the state of the art to make use of plastic materials in the manufacture of gear wheels so as to achieve a low-noise operation. However, such gear wheels have certain disadvantages with respect to life, lubrication and thermal effects. It is also known from the state of the art to design a gear mechanism in such a manner that a multiple bending or deflection of the teeth of the driven wheel with respect to the teeth of the drive wheel is produced. The disadvantage of this construction is its complicated and expensive fabrication and the relatively small field of application.

Further known from the prior art is a method of manufacturing gear wheels for low-noise gears which makes use of a phenol-formaldehyde resin and fiber fabric webs. Also this proposal has been found wanting in respect of the manufacturing process and the life of the finished product.

It has further been proposed heretofore to produce a noise-dampened gear wheel by positioning a damper in the form of a hollow thin-walled ring between the flanges of the hub and the rim of the gear wheel. The disadvantages of this construction are the high manufacturing costs and the large space requirements.

All of the prior art low-noise gear wheels have the disadvantage of a low degree of power transmission.

It is the object of the present invention to provide a method and device as stated in the foregoing so as to obtain a reduction in the noise level of the gear wheels of a gear mechanism in an advantageous and novel manner.

This object is achieved according to the invention in that in a gear cutting machine known per se the gear cutting errors are reduced and/or the remaining residual errors are superimposed by errors having a higher frequency. Taking into due consideration the life, the thermal properties and other characteristics specific to gear wheels, the gear wheel according to the invention is designed to be so deformed that, when it engages with another wheel in the gear, a noise level will result which is outside of the human hearing capacity. By reducing the gear cutting errors, a reduction in the degree of noise is obtained which is followed by superimposing errors of a higher frequency upon the residual errors of lower frequency so that the resultant overall noise level is one that lies outside of the human range of sound perception. Thus, by first reducing one kind of errors and then combining the residual errors in a specific manner with a number of errors of a different kind, an unexpected and novel effect is produced.

The device for carrying out the method according to the invention is so constructed that in a machine tool equipped with a workslide, a workspindle, a gear wheel and a drive wheel for the workspindle, an indexing or rotary table, an index worm gear, an index worm, a gear wheel and a drive wheel for the index worm, the gear wheel for the workspindle and/or the gear wheel for the index worm is provided with structural members which are suitable to reduce gear cutting errors and/or hobbing roundness errors.

In combination with the index worm and the workspindle, respectively, which inherently have play and manufacturing errors, compounding of errors is effected such that the finished gear wheel has an error combination which produces a noise level, when the gear wheel engages with another gear wheel, which lies outside of the hearing range of the human ear.

In further developing the object of the present invention, the gear wheel, to reduce gear cutting errors, may be disposed eccentrically on the shaft connected to the workspindle and/or the index worm, respectively. To this end, the shaft may be provided with an extension of reduced diameter having a threaded end section. Disposed on the shaft between the gear wheel and the shaft extension is an eccentric socket, and a nut having an internal screw thread is secured to the threaded end section of the shaft extension simultaneously acting upon the eccentric socket. This produces, in a simple fashion, an eccentricity of the gear wheel which may lie between zero and 2e.

According to another feature of the invention, the connection between the eccentric sleeve or socket and the shaft may be established by at least one locking element extending through the gear wheel. Such locking element may consist of a cylindrical pin, a conical pin or a screw.

Another embodiment of the invention provides for two axially spaced gear wheels which are eccentrically disposed on the shaft in axial alignment with two eccentric sockets and an intermediate socket. The two gear wheels are separately eccentrically adjustable to ensure in a simple fashion a forward and reverse motion during the machining of the gear wheels.

According to a further embodiment of the invention, at least one locking element may be provided to extend through the two gear wheels, the two eccentric sockets and the intermediate socket, the intermediate socket and the shaft extension being provided with means to prevent rotational movement, for instance in the form of a polygon connection.

In another embodiment of the invention, the shaft extension is provided with a threaded end section to which a screw nut is secured which acts by way of an intermediate member upon the eccentric socket.

According to yet another embodiment of the invention, the gear wheel having hobbing roundness errors may be made of two pieces, one being the gear wheel carrying member connected to the shaft and the other being the outer portion or facing ("bandage") of the gear wheel which is permanently deformed in a polygonal shape. This polygonal deformation serves to purposely incur hobbing roundness errors which in combination with the machining errors of the index worm and the workspindle, resp., produce the afore-mentioned beneficial effect in the noise-reduction properties of the gear wheel.

According to a further feature of the embodiment just described, the gear wheel facing may be thin-walled and connected to the gear wheel carrying member by at least one pin, depending on the desired period and amplitude of the hobbing roundness error. The pin may take the form of a conical pin, a cylindrical pin or a conical pin having an adjustable screw thread. The connection between shaft and gear wheel carrying member may be established by at least one conical pin and/or at least one cylindrical screw.

Yet another embodiment of the invention provides for two gear wheels, each of which consists of two component parts, namely, a gear wheel carrying member and a gear wheel facing which is connected to the carrying member by at least one pin, depending on the desired period and amplitude of the roundness errors. According to another feature of the present invention, the gear wheel carrying member may be of an eccentric configuration and may be disposed in serially aligned relationship with an eccentric socket and an intermediary socket on the shaft extension. In this instance, the gear wheel carrying members are adapted to be separately eccentrically adjustable.

The eccentric sockets, the intermediary socket and the two gear wheel carriers may be secured by at least one safety member extending therethrough, with the shaft extension and the intermediary socket being provided with rotation preventing means, such as, for instance, a polygonal connecting piece.

According to another feature, the shaft extension of reduced diameter may be provided with a threaded end section to receive a screw nut which acts upon one of the two eccentric sockets by way of an interposed member.

The invention will be described in further detail with reference to the exemplary embodiments illustrated in the accompanying drawings, in which.

Figure 1:
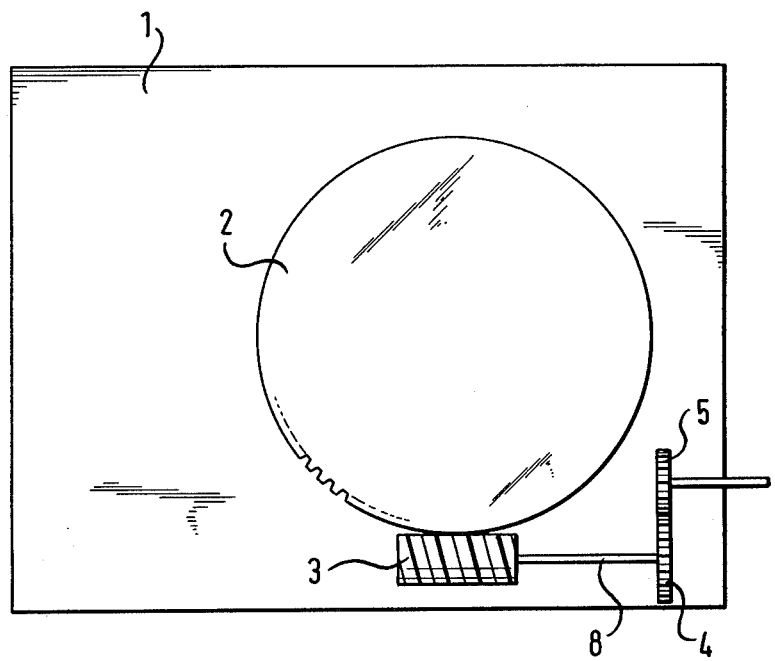
FIG. 1 is a schematic top plan view of a gear cutting machine.

Referring to FIG. 1, the schematic top plan view of a gear cutting machine known per se includes a workslide 1, an index worm gear 2 with an index worm 3, a gear wheel 4 on the index worm shaft 8, and a drive wheel 5. By this arrangement, the revolution of an indexing or rotary table is effected which is connected to the index worm gear 2.

Figure 11:
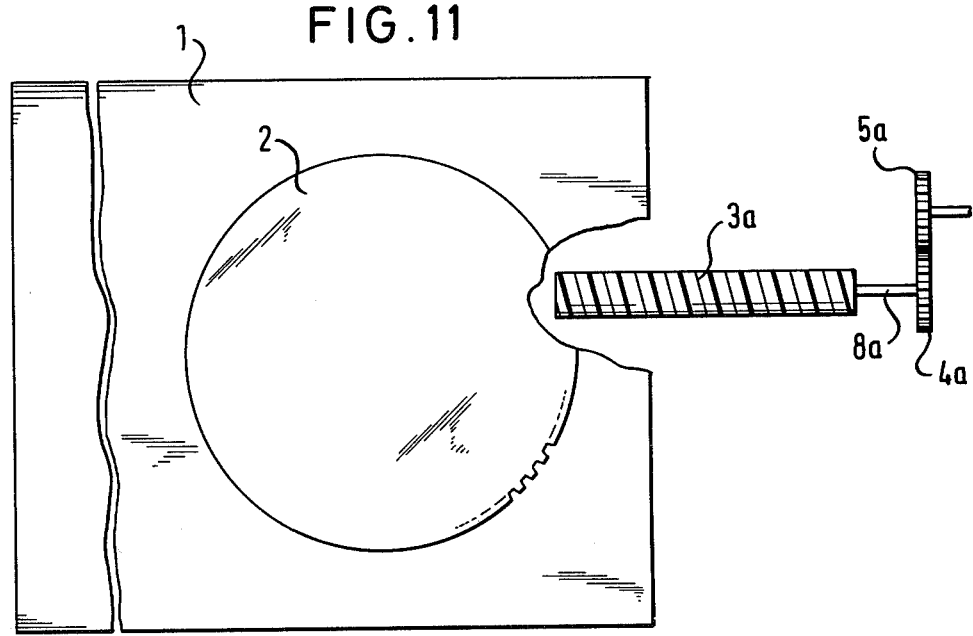
FIG. 11 is a top plan view of a gear cutting machine known per se, showing the hobbing spindle.

In the embodiment of FIG. 11, the workslide 1 is connected to a work or hobbing spindle 3a which by way of a shaft 8a is in communication with a gear wheel 4a and a drive gear 5a. The index worm 3 of the embodiment of FIG. 1 and the hobbing spindle 3a of the embodiment of FIG. 11, respectively, are critical in the operation of the feed mechanism of the gear cutting machine in a functionally correct fashion.

The gear wheels 4 and 4a, respectively are so constructed that gear cutting errors are reduced, and the remaining residual errors are superimposed by errors having a higher frequency. This results in an error characteristic of the gear wheel which produces a noise level, when the gear wheel is operating inside a housing, which lies outside of the human range of sound perception.

Figure 2:
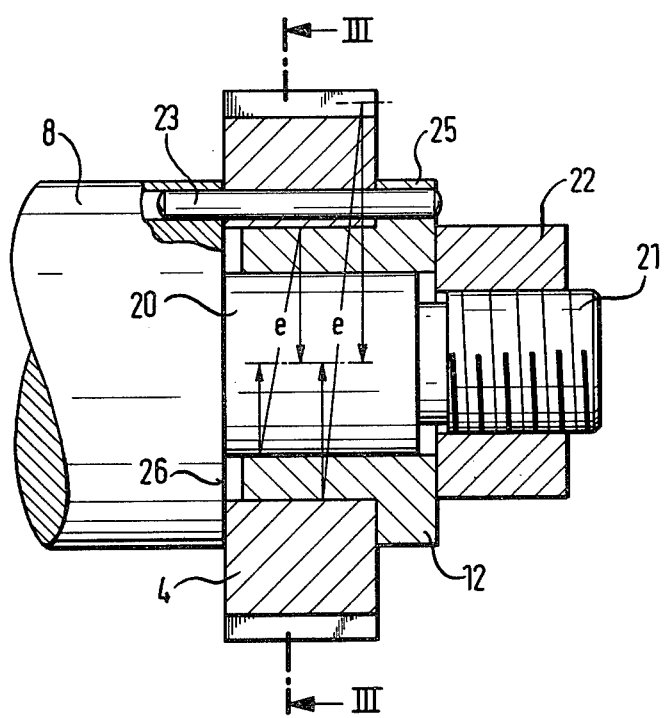
FIG. 2 is a side view in section of the gear wheel on the index worm.
Figure 3:
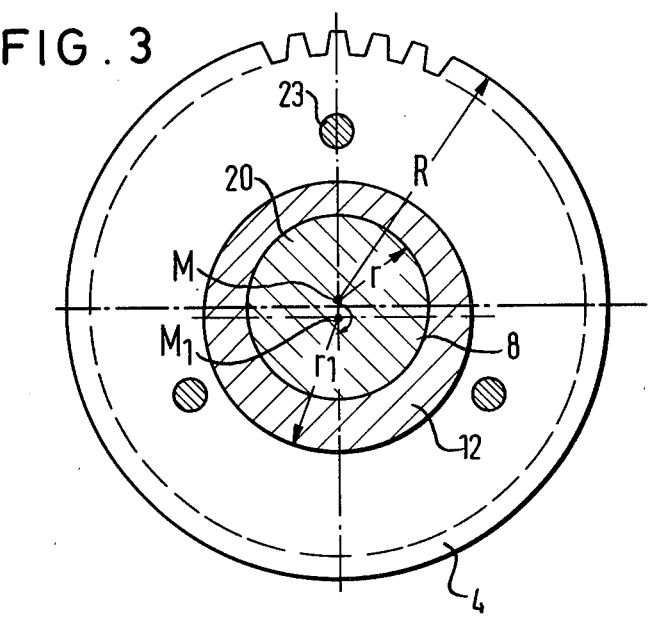
FIG. 3 is a sectional view along the line III—III of FIG. 2.
Figure 4:
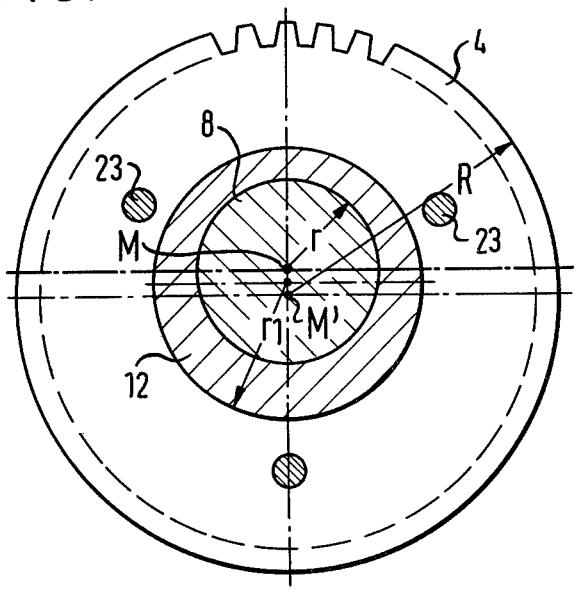
FIG. 4 is a view similar to FIG. 3, indicating complete eccentricity 2e.

FIGS. 2, 3 and 4 are more detailed illustrations of a gear wheel 4. The gear wheel 4 is disposed on an eccentric socket 12 which is placed on the extension 20 of the shaft 8. As shown in FIG. 2, the extension 20 is provided at its front end with a threaded section 21. The gear wheel 4 and the eccentric socket 12 have an eccentricity e with respect to their bores, as indicated in FIG. 2. Owing to this eccentricity, gear cutting errors can be reduced so that, ultimately, a reduction in the noise level can be brought about.

The gear wheel 4 is secured in position by means of a locking member 23 which is connected to a flange 25 on the eccentric socket 12. The member 23 in the form of a pin is driven into the front side 26 of the rectangularly recessed extension 20 of the shaft 8. A screw nut 22, together with a safety element not illustrated, is secured to the threaded section 21, thereby holding the eccentric socket 12 in a functionally correct position.

As shown in FIG. 3, it is possible that the radius R of the gear wheel 4 and the radius r of the shaft extension 20 have the same center point M. In this instance, the eccentric socket 12 has a center point $M_1$ and a radius $r_1$. Rotating the gear wheel 4 from the position shown in FIG. 3 into the position shown in FIG. 4, i.e. by 180°, will move the radius R to the point M' whereby a maximum eccentricity of 2e is obtained.

In accordance with the present invention, the gear wheel 4 may be installed at an eccentricity with respect to the shaft extension 20 which ranges from zero to 2e, as shown in FIG. 3. When the desired position has been reached, the gear wheel is locked in this position by locking means 23, consisting in the instant case of three elements, so that a situation as illustrated in FIG. 2 will prevail.

Figure 5:
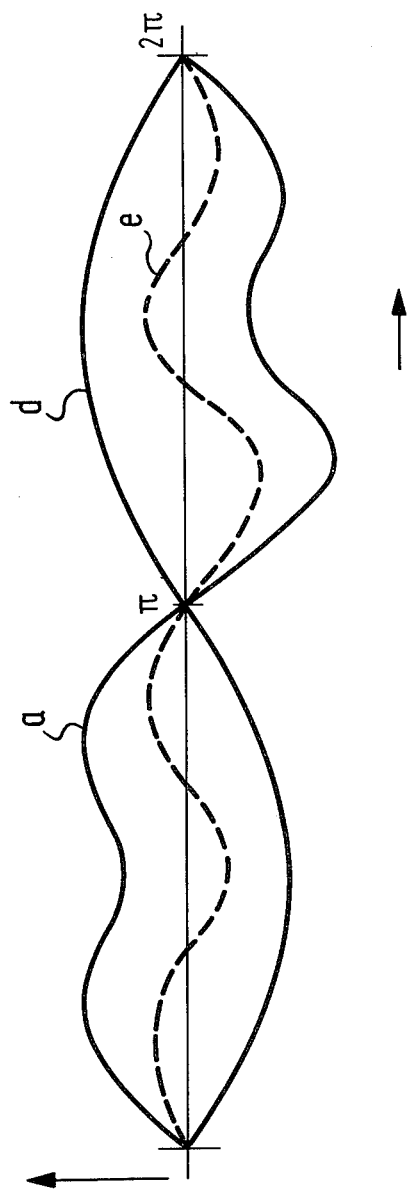
FIG. 5 is a graph representing the errors on the index worm and the roundness errors, respectively, and the resultant error curve.

FIG. 5 shows the curves obtainable with the foregoing arrangement, as produced by the angle of rotation of the index worm shaft. Curve a represents the machining errors of the index worm 3. Curve d represents the roundness error due to a continuously adjustable eccentricity e of the gear wheel 4 on the index worm shaft 8 in accordance with the embodiment of FIGS. 2, 3 and 4. Adding the two curves a and d together will give a resultant error curve e.

Figure 6:
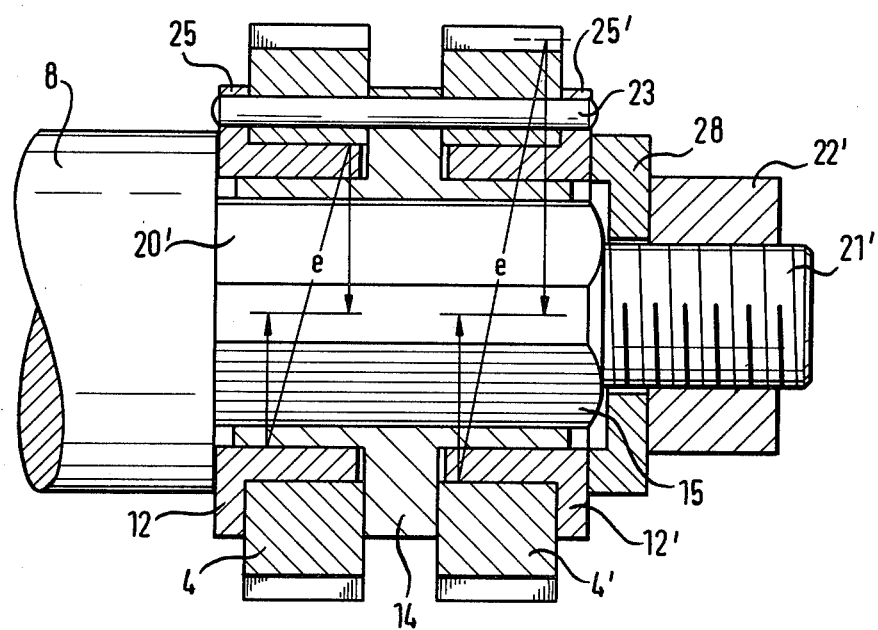
FIG. 6 illustrates another embodiment of a gear wheel.

FIG. 6 illustrates another embodiment of the invention. In order to produce a counterclockwise movement or a clockwise movement, respectively, two gear wheels 4 and 4' are eccentrically arranged on the shaft extension 20' in axially spaced relationship, over two eccentric sockets 12 and 12' and an intermediate socket 14. The shaft extension 20' and the intermediate socket 14 are protected against rotation by a polygonal connecting member 15, establishing a tight fit of the two members. The front section 21' of the shaft extension 20' is provided with a screw thread to which a nut 22' is secured, thereby locking the eccentric socket in position by way of an intermediary element 28. Each of the eccentric sockets 12 and 12' is provided with a flange 25 and 25', respectively. At least one connecting element 23, for instance a cylindrical pin, extends through the two flanges 25 and 25' of the eccentric sockets 12 and 12', the two gear wheels 4 and 4' and the intermediary socket 14, to effect an interconnection of the individual members. The two gear wheels 4 and 4' are separately eccentrically adjustable. All members are fixedly connected to one another, protected against rotation, by means of the locking device in the form of the polygonal connection 15 disposed between the extension 20' and the intermediary socket 14.

Figure 7:
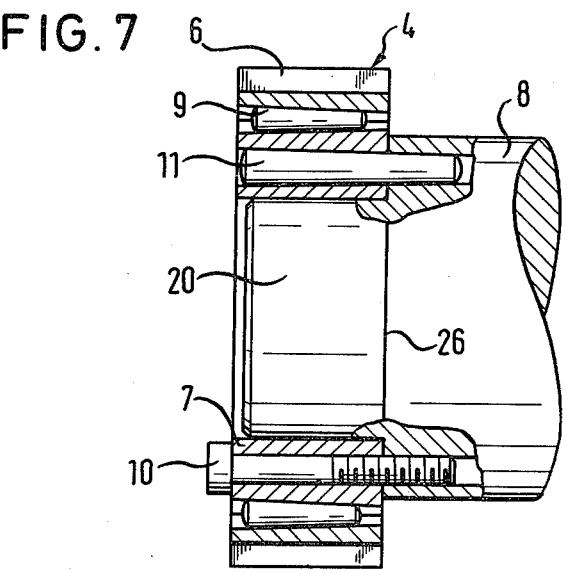
FIG. 7 illustrates another embodiment of the gear wheel according to the invention, consisting of a gear wheel facing and a gear wheel carrying member.
Figure 8:
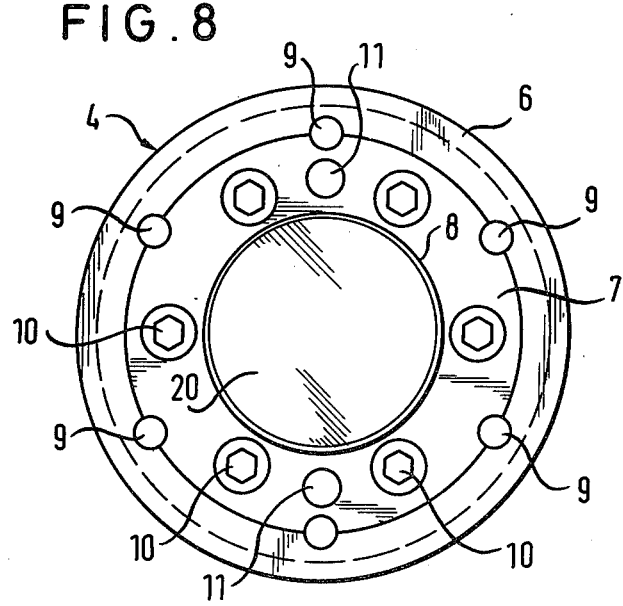
FIG. 8 is a front view of the gear wheel of FIG. 7.

As is shown in FIGS. 7 and 8, the gear wheel 4 or 4a, respectively, may also take the form of a two-piece structure, the two components consisting of a gear wheel carrying member 7 and a gear wheel facing 6. The facing 6 is deformable. When the facing 6 is installed on the rigid carrier member 7 and is secured thereto by conical pins 9, the facing 6 will undergo permanent deformation, in dependence upon the number of conical pins 9, so that a polygonal configuration of the toothed section is obtained. Instead of conical pins there may be used cylindrical pins or conical pins having adjustable threaded sections.

The assembly as a whole is placed onto the extension 20 of the shaft 8 and is secured to the front side 26 of the shaft 8 by means of conical pins 11 and/or cylindrical head screws 10. In the embodiment of FIG. 8, six conical pins 9 have been used to fixedly join the gear wheel facing 6 to the gear wheel carrier 7.

Figure 9:
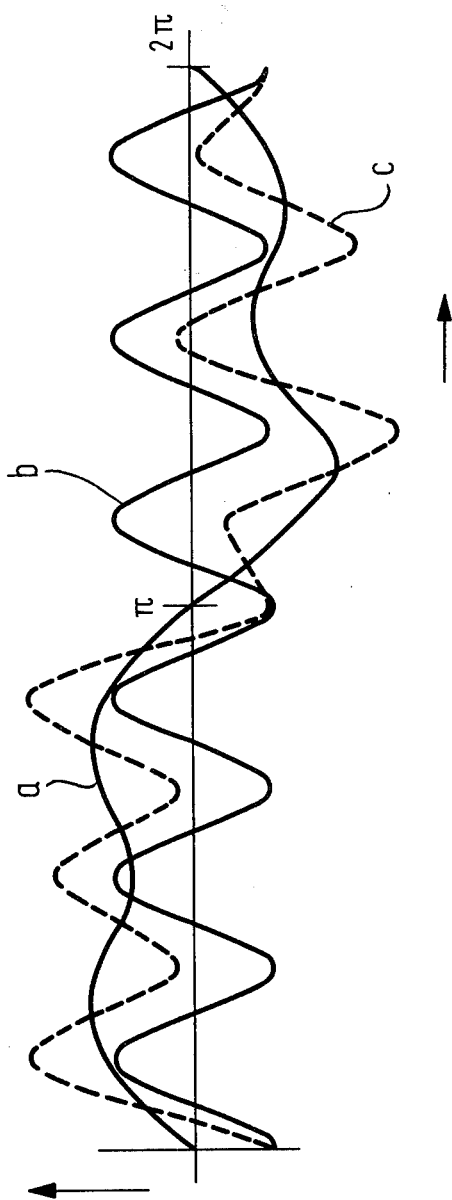
FIG. 9 is a graph of the errors on the index worm and the roundness errors of the polygonal gear wheel, and the resultant error curve.

The number of conical pins 9 depends on the desired period and amplitude of the hobbing roundness error. Installing a gear wheel of this type of construction in a machine tool will produce a curve as shown in FIG. 9. Curve a represents the machining error of the index worm 3 or the hobbing spindle 3a, respectively. Curve b represents the roundness error of a gear wheel 4 of the type illustrated in FIGS. 7 and 8. As previously described, the curves may represent both the gear wheel 4 on the index worm shaft 3 as well as the gear wheel 4a on the spindle 3a.

Adding the curves a and b together will give a resultant error which is represented by curve c in FIG. 9.

Figure 10:
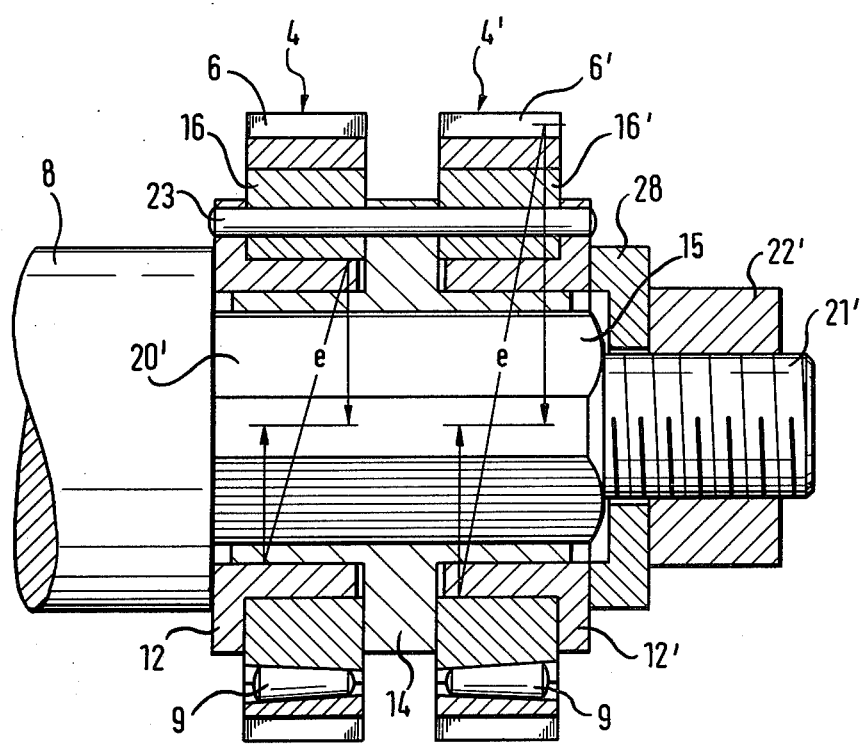
FIG. 10 is another embodiment of the invention in a side elevational view.

A further embodiment of the invention is shown in FIG. 10, wherein two axially spaced gear wheels 4 and 4' are provided, each of which consist of a gear wheel facing 6 and 6', respectively, and a gear wheel carrier 16 and 16', respectively. The two gear wheels serve to produce oppositely directed rotary motion. As in FIGS. 7 and 8, the gear wheel carriers and the facings are joined together by conical pins 9.

In addition, the two gear wheel carriers 16 and 16' are eccentric in configuration and are separately eccentrically adjustable. These eccentric gear wheel carriers 16 and 16' are disposed on eccentric sockets 12 and 12' analogous to the structural embodiment of FIGS. 3 and 4. There is also provided an intermediate socket 14 which is connected to the extension 20' of the shaft 8 by means of a polygonal member 15. The eccentric sockets 12 and 12' along with the eccentric wheel carriers 16 and 16' have an eccentricity e with respect to the gear wheels 4 and 4'.

Analogous to the structural embodiments previously described, at least one locking member 23 extends through the two eccentric sockets 12 and 12', the two eccentric gear wheel carriers 16 and 16' and the intermediate socket 14, to establish a firm connection. The entire assembly is fixedly secured in axial direction by means of a nut 22', including a safety member not illustrated, which is threadedly attached to the threaded section 21' of the shaft extension 20'.

The just described type of construction, which is a combination of the constructions illustrated in FIGS. 3 and 4 and FIGS. 7 and 8 and which utilizes two axially spaced gear wheels 4 and 4' for producing contrary rotary motion, enables a reduction in gear cutting errors due to the eccentric sockets 12 and 12', and the superimposition of errors of a higher frequency on the remaining gear cutting errors, due to the polygonal deformation of the gear wheel facings 6 and 6', respectively. The beneficial result is that the operational noise level of the gear wheels thus produced lies outside the human hearing range.

Figure 12:
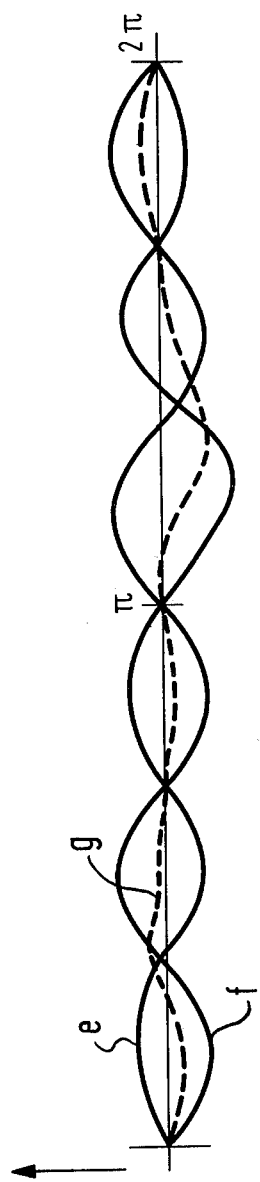
FIGS. 12 to 15 are graphs of the error curves of the gear wheels according to the invention.

Taking the resultant error curve e from FIG. 5 and adding it to a curve f, which represents the roundness error on the the polygonal gear wheel 4 in dependence of the number of conical pins and the error amplitude, will give a curve g as shown in FIG. 12.

Figure 13:
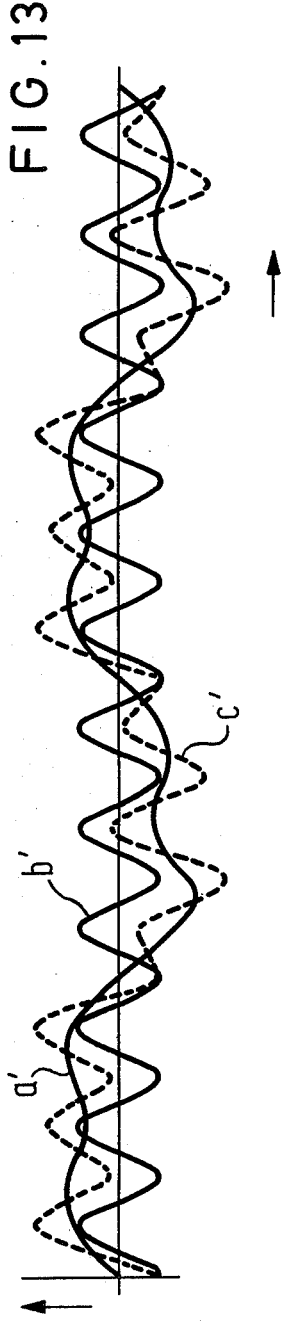

FIG. 13 illustrates the error curves of the hobbing error. Curve a' represents the error on the index worm 3 or the hobbing spindle 3a, respectively, and curve b' represents the roundness error on the polygonal gear wheel of the index worm shaft 8 or the shaft 8a in FIG. 11, resp. Curve c' is the resultant.

Figure 14:
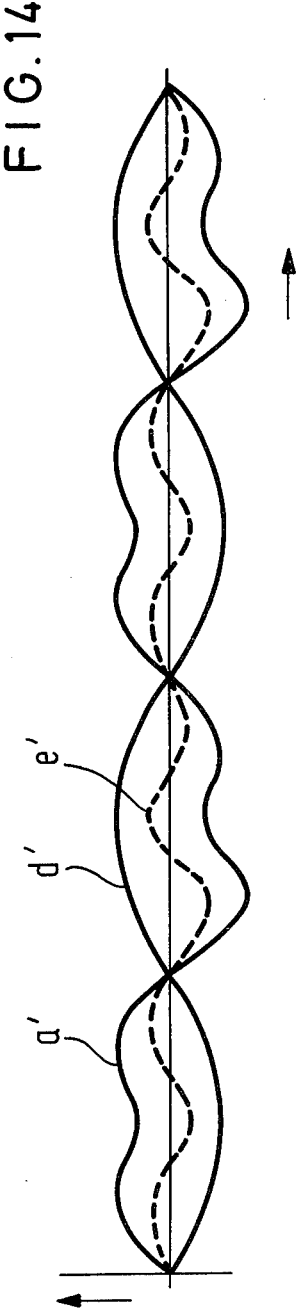

In FIG. 14, curve a' again represents the error on the index worm respectively, the hobbing spindle, and curve d' represents the roundness error occurring at continuously adjustable eccentricity of the gear wheel 4. The resultant is a curve e', analogous to the representation of FIG. 5.

Figure 15:
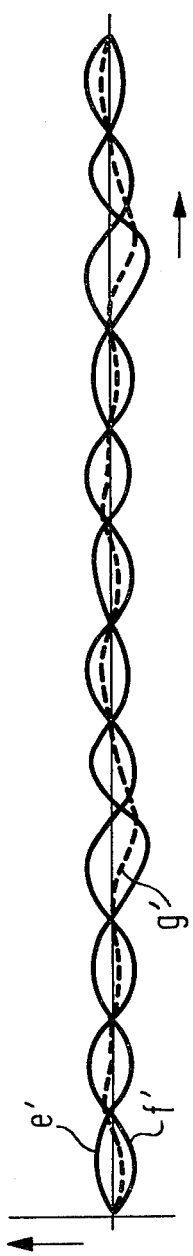

FIG. 15 is the combination of the curves e' and f' analogous to the graph of FIG. 12, with the resultant being the curve g'.

In summary, the particular structural configuration of the gear wheels 4 and 4', respectively, manufactured on a conventional machine tool, permits a reduction in gear cutting errors and the subsequent superimposition on the gear wheel of an error characteristic having a higher frequency, with the result that a gear wheel of such novel construction displays an operational noise level which lies outside the range of human hearing capacity.

I claim:

1. In a gear cutting machine including a cutter support, a cutter and cutter drive, a work support, a work support drive and a gear train interconnecting said cutter drive and said work support drive for synchronous rotation of said cutter and a workpiece, said work support drive including a workslide (1), an indexing worm gear (2) mounted on said workslide and driven by a worm (3) mounted on a worm shaft (8) driven by at least one gear wheel (4) and a drive gear (5), said shaft including an extension portion (20) terminating in a threaded section (21) configured to receive a locking nut (22) thereon; an eccentric socket (12) mounted on said extension portion and adjustably supporting said gear wheel (4) thereon for relative rotative adjustment with respect thereto, and locking means selectively interconnecting said shaft, said eccentric socket and said gear wheel in a selected relative position and against relative rotation with respect to each other, whereby the eccentric mounting of the gear wheel may be adjusted to produce cyclic variation of the work rotation with respect to the cutter.

2. The device of claim 1 in which said locking member is a cylindrical pin.

3. The device of claim 2 in which there are two gear wheels adjustably eccentrically disposed on said shaft in axially spaced relationship over two eccentric sockets and an intermediary socket.

4. The device of claim 3 in which a locking member extends through the two gear wheels, the two eccentric sockets and the intermediate socket and there are means retaining the intermediate socket from rotation.

5. The device of claim 4 in which said retaining means include the shaft having an extension of reduced diameter and having a threaded end section, a nut threadedly attached to the threaded end section and an intermediary element between the nut and intermediate socket to fixedly secure the eccentric sockets between the shaft and the intermediate element.

6. In a gear cutting machine including a cutter support, a cutter and cutter drive, a work support, a work support drive and a gear train interconnecting said cutter drive and said work support drive for synchronous rotation of said cutter and a workpiece, said work support drive including a workslide (1), an indexing worm gear (2) mounted on said workslide and driven by a worm (3) mounted on a worm shaft (8) driven by at least one gear wheel (4) and a drive gear (5), said shaft including an extension portion (20), a carrier member (7) mounted on said extension and secured to said shaft (8) by at least one penetrating fastener (10), (11) extending through said carrier and into said shaft, said gear wheel further including a deformable gear wheel facing and at least one conical deforming pin extending between said carrier and said gear wheel facing and deforming said gear wheel facing whereby said deformation of said gear wheel facing may be employed to produce cyclic variation of the work rotation with respect to the cutter.

7. The device of claim 6 in which the gear wheel comprises a gear wheel carrier connected to a shaft and a gear wheel facing that is polygonally deformed.

8. The device of claim 7 in which the gear wheel facing is thin walled and there is at least one pin connecting the facing to the carrier.

9. The device of claim 7 in which there are two of said gear wheels carried on one shaft and there is at least one pin joining said gear wheel carrier and facing.

10. The device of claim 7 in which said gear wheel carriers are of an eccentric configuration, the shaft includes an extension and the carriers are disposed on the shaft by way of eccentric sockets and an intermediate socket, the gear wheel carriers being separately eccentrically adjustable.

11. The device of claim 10 in which there is at least one locking member passing through the eccentric sockets, the intermediate socket and the two gear wheel carriers, there being means retaining the intermediary socket from rotation.

12. The device of claim 11 in which the shaft extension has a threaded end portion, there is a nut threadedly attached to the end portion, and there is an element interposed between the nut and eccentric socket to fixedly secure the eccentric socket to the shaft.

13. The device of claim 6 in which there is one of at least one conical pin and at least one cylindrical screw between the shaft and the gear wheel carrier for connecting together the same.

14. The device of claim 6 in which said penetrating fastener is a cylindrical pin.

15. The device of claim 6 in which said penetrating fastener is a conical pin having an adjustable thread.

* * * * *